United States Patent
Winter

(10) Patent No.: US 9,426,064 B2
(45) Date of Patent: Aug. 23, 2016

(54) PATHWAY DECISION FORWARDING FOR RACK DOMAINS

(71) Applicant: Robert Lee Winter, Burnet, TX (US)

(72) Inventor: Robert Lee Winter, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 14/061,695

(22) Filed: Oct. 23, 2013

(65) Prior Publication Data

US 2015/0110109 A1    Apr. 23, 2015

(51) Int. Cl.
*H04L 12/721* (2013.01)

(52) U.S. Cl.
CPC .................................... *H04L 45/72* (2013.01)

(58) Field of Classification Search
None
See application file for complete search history.

(56) References Cited

U.S. PATENT DOCUMENTS

| | | | | |
|---|---|---|---|---|
| 2004/0246975 | A1* | 12/2004 | Joshi ..................... | H04L 45/02 370/395.31 |
| 2006/0101157 | A1* | 5/2006 | Eardley .................. | H04L 45/00 709/239 |
| 2014/0185611 | A1* | 7/2014 | Lie et al. ...................... | 370/355 |

OTHER PUBLICATIONS

"Hyperbolic Embedding and Routing for Dynamic Graphs", Andrej Cvetkovski and Mark Crovella, IEEE INFOCOM 2009 proceedings.*
P. Hasio et al., "Gravity routing in ad hoc networks: integrating geographical and topology-based routing", Parallel Architectures, 2004.
SeaMicro, "SeaMicro Freedom Fabric Storage", [online], 1 page, http://www.seamicro.com/products/freedomfabricstorage, 2014.
SeaMicro, "Data Sheet: SeaMicro Freedom Fabric Storage", Advanced Micro Devices, Inc., 3 pages, 2014.

* cited by examiner

*Primary Examiner* — Derrick Ferris
*Assistant Examiner* — Jay Vogel
(74) *Attorney, Agent, or Firm* — Baker Botts L.L.P.

(57) ABSTRACT

Methods and systems for improved pathway decision forwarding for rack domains include a gravity well forwarding protocol that enables local forwarding decisions at each network node involved with forwarding packets. The gravity well forwarding protocol may administer gravity well values for each of a plurality of rack domain nodes in a rack domain. The local forwarding decisions may involve selecting output ports corresponding to a higher/lower gravity well value at a network switching element, depending on a destination gravity well value associated with a network packet. Assignment of the gravity well values among the rack domain nodes may be used according to considerations, including security considerations, throughput considerations, loading considerations, redundancy considerations, physical location, and/or physical proximity, among other considerations, in the rack domain.

12 Claims, 4 Drawing Sheets

PATHWAY DECISION FORWARDING FOR RACK DOMAINS

BACKGROUND

1. Field of the Disclosure

This disclosure relates generally to information handling systems in rack domains and more particularly to a system and method for improved pathway decision forwarding for rack domains.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In particular, data centers have been established that may include large pluralities of individual information handling systems to provide scalable computing and network communication resources. These data centers are typically designed to optimize consumption and/or availability of resources such as space, energy, power consumption, and various types of communication links.

As used herein, the term 'data center' shall also refer to so called "server farms" that comprise pluralities of individual information handling systems in a rack format, also referred to herein as a "rack domain". The rack format may include rows of so-called "blade servers" (among other types of hardware) representing information handling systems of a form factor to install in an industrial rack and/or bus system. In addition to blade servers and/or different types of information handling systems, network switches may be installed within the racks of a rack domain to enable network connectivity for groups and/or sub-groups of the information handling systems in the rack domain.

Wide-area networks that connect entire data centers with one another may exhibit different operational conditions than data center networks connecting local nodes to form a rack domain of a given data center. It is noted that network traffic is routed through both wide-area networks and data center networks when being processed and transmitted among different data centers. The differing operational conditions may arise from unique architecture and topology associated with each type of network, respectively.

In particular, data center networks, including so-called "intra-rack networks", may provide network connectivity for local nodes over dedicated links, and may often be implemented with a minimum of additional services or complexity, beyond certain given functionality. For example, certain data center networks may be tiered, highly scalable, traditionally forwarded/routed using Layer 2/Layer 3 switching and routing elements (as given by the Open Systems Interconnection (OSI) model, also referred to as ISO/IEC 7498-1), may use standard network protocols, and may provide various overlays for services and security. Conventional networking technologies and/or networking technologies used particularly for wide-area networking, for example, may not address certain specific operational conditions found within rack domains of a data center.

SUMMARY

In one aspect, a disclosed method includes receiving an incoming packet at a first rack domain node having a first gravity well value, and determining whether to forward the incoming packet using gravity well forwarding. When the incoming packet is forwarded using gravity well forwarding, the method may include identifying a gravity well destination value for the incoming packet. Based on the gravity well destination value, the method may include selecting an output port of the first rack domain node and forwarding the incoming packet to the output port. The output port may correspond to one of: a second rack domain node having a second gravity well value and a third rack domain node having a third gravity well value. The second gravity well value may be greater than the first gravity well value, and the first gravity well value may be greater than the third gravity well value.

Other disclosed aspects include article of manufacture comprising a non-transitory computer-readable medium storing instructions executable by a processor, and a network switching element comprising a processor having access to a memory and a plurality of network ports.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
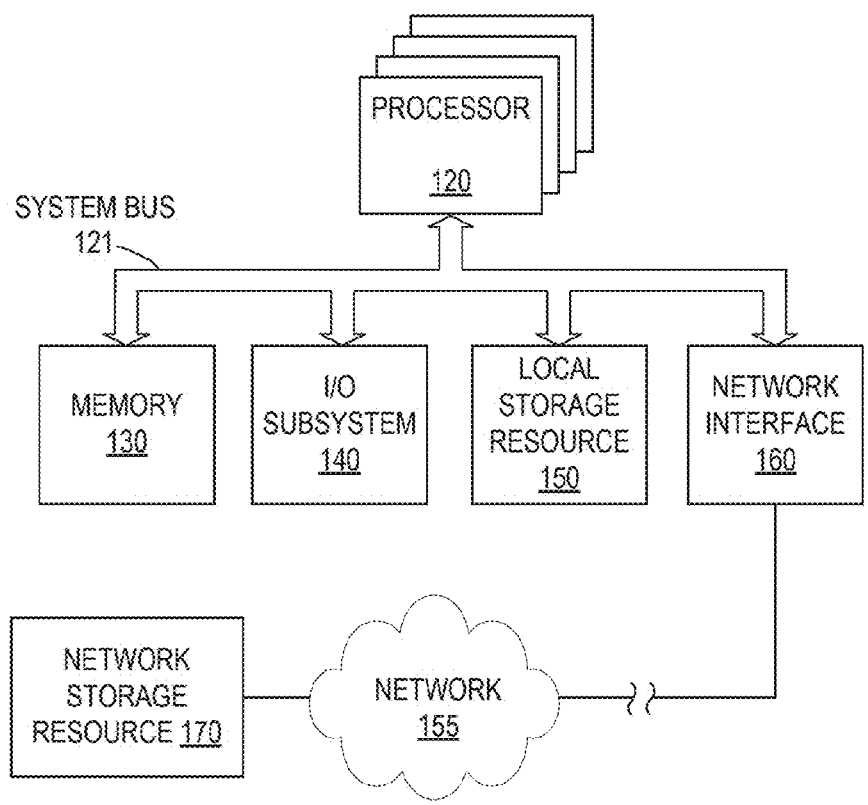
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

As noted previously, rack domains represent a unique type of network architecture with specific unique features. A rack domain may be a closed domain with a finite number of nodes. The distance between nodes in a rack domain may typically be relatively short, for example, about 2 meters. The nodes may include switching elements that forward/route packets among other nodes that are information handling systems, such as blade servers within a blade chassis that is housed in a rack. A typical rack domain may include a number of switching elements based on hardware configurations. For example, each blade chassis may include a blade switch to interconnect the blade servers housed in the blade chassis. Additionally, each rack may include a top-level switch to interconnect the blade chassis housed in the rack. The combination of such a switching configuration may lead to a high density of switching elements within the rack domain. As a result, network packets traversing a typical rack domain may be forced to follow a circuitous path with corresponding inefficiencies, such as having to traverse a number of different switching elements.

Additionally, each of the switching elements in the rack domain may use conventional Layer 2/Layer 3 protocols, such as those specified by the Institute of Electrical and Electronics Engineers (IEEE) and/or the Internet Engineering Task Force (IETF). Such conventional protocols may be poorly suited for use within a rack domain, because of the communication between switching elements that is inherent in such protocols. For example, switching elements may be self-configuring in a new network environment, which may be realized by sending out discovery packets on the ports of the switching element and obtaining corresponding responses from connected devices, such as other switching elements, to create look-up-tables representing network topology that are subsequently used by the switching element to forward/route incoming packets. In a rack domain, with a high density of switching elements, such communication between switching elements may represent an undesirably high level of network usage. For example, when a state change (e.g., change in node configuration, either physical or logical) in a network pathway of a rack domain occurs, the conventional protocols may result in additional communication simply to record the state change at a number of associated switching elements. Thus, within a sizable rack domain with large numbers of nodes, the conventional protocols may result in an undesirable level of communication among switching elements.

Additionally, certain overlays used with the conventional Layer 2/Layer 3 protocols in a rack domain may result in disadvantages and/or constraints. For example, a spanning tree may be implemented to avoid looped forwarding paths within a rack domain, which may often include a network mesh topology. However, the use of spanning trees to eliminate redundant pathways may involve certain drawbacks, since the spanning tree defines a unique path between a pair of nodes in the rack domain, while other network pathways between the pair of nodes, when traversed, will result in packet loss and packet regeneration. Also, because the spanning tree constrains the number and/or the flow direction of network pathways, spanning trees may result in poor distribution of network traffic over the available hardware infrastructure in the rack domain, which may artificially curtail the performance of the hardware infrastructure by failing to distribute network traffic according to the available bandwidth of the rack domain.

Still further, the conventional protocols typically used in switching elements may adhere to well-known rules for the determination of a communication path from a source to a destination in a network domain, such as a rack domain. Since these rules, which may be implemented according to published standards and/or specifications, may be well known, use of the conventional protocols may also present an opportunity for malicious attacks on a network's security and/or integrity. Information handling system nodes, such as virtual or physical server nodes, may be identified by some combination of tuples (e.g., matches of content with fields of a network packet), which may include items such as an Internet-protocol (IP) address, a media access controller (MAC) address, virtual local area network (VLAN) identifiers and/or transmission control protocol (TCP) port(s), among others. A switching element using conventional protocols connected to the information handling system nodes may possess the ability to map the tuple sets to the appropriate information handling system nodes as packets traverse the network pathways. Accordingly, once an intrusion occurs in a network employing conventional protocols, it may be a relatively simple matter for an intruder to ascertain which network pathways are used, and which switching elements are employed, including controller switching elements and routers, thus exposing pathways and/or nodes, which may then be susceptible for malicious targeting.

Thus, within a rack domain, the use of conventional protocols, such as IP routing and Layer 2 forwarding protocols according to IEEE/IETF specifications, may involve performance degradation and undesired limitations, and may not be optimal in terms of overhead, administration and/or security, among other aspects. As will be described in further detail herein, methods and systems for an improved pathway decision forwarding for rack domains, referred to herein as "gravity well forwarding", are disclosed that provide light-weight, autonomous pathway determination algorithms and associated network topologies. Gravity well forwarding, as described herein, may provide an internal logical fabric to access switching elements within a rack domain and/or a localized network domain. Gravity well routing may represent a network pathway determination method that may provide dynamic and non-trivial pathway decisions, which may be decentral decisions at each network hop, thereby improving security. Gravity well routing may be used to attain efficient pathway determination among the nodes of a rack domain.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or the error detection system, both described more fully below, may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, and 4 wherein like numbers are used to indicate like and corresponding parts.

Turning now to the drawings, FIG. 1 illustrates a block diagram depicting selected elements of an embodiment of system 100 for improving access to storage resources using a storage virtual appliance, in accordance with the present disclosure. As depicted in FIG. 1, system 100 may represent an information handling system comprising various elements. Also shown with system 100 are external or remote elements, namely, network 155 and network storage resource 170.

As shown in FIG. 1, components of system 100 may include, but are not limited to, processor 120, which may comprise one or more processors, and system bus 121 that communicatively couples various system components to processor 120 including, for example, a memory 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, system 100 and network 155 may be included in a rack domain.

As depicted in FIG. 1, processor 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor 120 may interpret and/or execute program instructions and/or process data stored locally (e.g., in memory 130 and/or another component). In the same or alternative embodiments, processor 120 may interpret and/or execute program instructions and/or process data stored remotely (e.g., in network storage resource 170).

Also in FIG. 1, memory 130 may comprise a system, device, or apparatus operable to retain and/or retrieve program instructions and/or data for a period of time (e.g., computer-readable media). Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces.

As noted, system 100 shown in FIG. 1, may represent a node in a rack domain that is linked with other nodes using a number of different switching elements.

Figure 2:
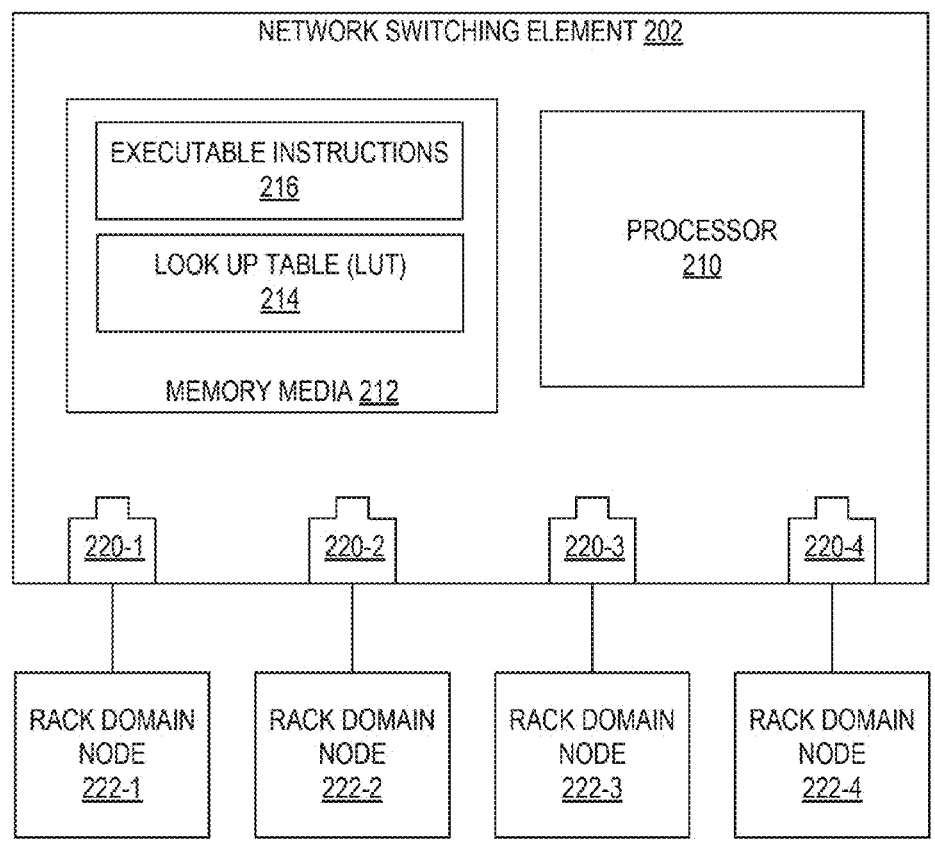
FIG. 2 is a block diagram of selected elements of an embodiment of rack domain.

Turning now to FIG. 2, a block diagram of selected elements of an embodiment of rack domain 200 is illustrated. In FIG. 2, rack domain 200 may represent a network domain in a data center with a high density of switching elements, of which network switching element 202 is shown as a singular example with additional detail. As shown, rack domain 200 includes rack domain nodes 222-1, 222-2, 222-3, 222-4, which respectively correspond to ports 220-1, 220-2, 220-3, 220-4. Rack domain nodes 222 may represent information handling systems 100 (see FIG. 1) and/or additional instances of network switching element 202, in various configurations.

In FIG. 2, internal elements of network switching element 202, as shown, include processor 210, memory media 212, and ports 220. Network switching element 202 may represent a suitable system, apparatus, or device configured to receive traffic and forward such traffic via ports 220, based on rules and/or algorithms for forwarding network traffic. As depicted in FIG. 2, memory media 212 may include executable instructions 216 and look up table (LUT) 214. Executable instructions 216 may represent instructions and/or code executable by processor 210 for implementing forwarding functionality and/or logic. LUT 214 may be used by network switching element 202 to store information associated with forwarding network traffic, and may include data structure, such as tables, graphs, etc., for mapping ports 220 with rack domain nodes 222. It is noted that processor 210 and/or memory media 212 may represent various types of processing functionality and may be embodied by a microprocessor and/or a field-programmable gate array (FPGA) and/or a system on chip (SoC), among other types of processing hardware. In particular, executable instructions 216 and LUT 214 may be used by network switching element 202 to implement gravity well forwarding, along with other instances of network switching elements (not shown in FIG. 2, see FIG. 3) in rack domain 200, as will be described in further detail.

Figure 3:
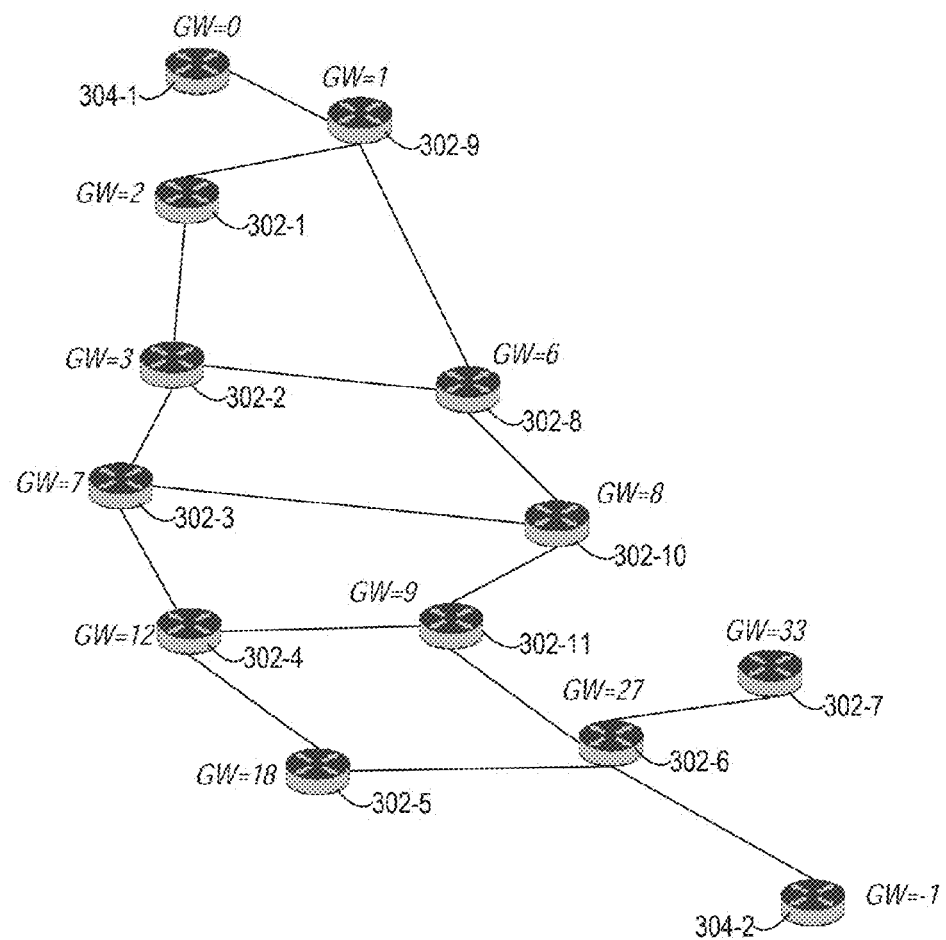
FIG. 3 is a block diagram of selected elements of an embodiment of rack domain.

Referring now to FIG. 3, a block diagram of selected elements of an embodiment of rack domain 300 for implementing gravity well routing is shown. Rack domain 300 may represent an embodiment of rack domain 200 (see FIG. 2). In FIG. 3, a plurality of rack domain nodes representing network switching elements 302 in a mesh configuration, as well as controller switching elements 304, are shown. It is noted that rack domain 300 is intended to represent a rack domain with a relatively high density of nodes, while information handling systems that may be endpoints of network pathways associated with individual ones of network switching elements 302 have been omitted for descriptive clarity. Furthermore, certain ones of network switching elements 302 may represent endpoints to external network domains (not shown) from which incoming packets may be received and may be forwarded to destinations within rack domain 300. In certain embodiments, incoming packets may be received from one external network domain and forwarded via rack domain 300 to another external network domain. In other embodiments, network pathways for forwarding traffic may originate and terminate within rack domain 300. The external network domains may be different types of network domains, such as VLANs (e.g., as defined by IEEE 802.1Q) and/or an IP domain. It is noted that rack domain 300 may be an Ethernet network, or another type of network fabric, as desired.

In FIG. 3, each instance of network switching elements 302 and controller switching elements 304 may be assigned a gravity well (GW) value. As shown, GW values of 0 and −1 may be reserved for controller switching elements 304, with controller switching element 304-1 having a GW value of 0 and controller switching element 304-2 having a GW value of −1. The GW values for controller switching elements 304 may be static values that do not change.

To implement gravity well routing in rack domain 300 of FIG. 3, at least one of controller switching elements 304 may server as an administrator and may assign integer GW values (excluding GW values 0 and −1) to a plurality of rack domain nodes, represented by network switching elements 302. The GW values may be assigned according to various considerations and/or to facilitate certain desired topologies within rack domain 300. For example, each of the plurality of rack domain nodes (i.e., network switching elements 302 in FIG. 3) may be assigned a different GW value. The GW values may be assigned to avoid looped forwarding paths when gravity well forwarding is used in rack domain 300. In this manner, the use of spanning trees to avoid redundant network pathways may be eliminated. Furthermore, as shown in exemplary rack domain 300, each instance of network switching element 302 may be linked to at least two other instances of network switching element 302, representing a node with a higher GW value and a node with a lower GW value. As will be described below, the GW values assigned in this manner may enable network switching elements 302 to implement gravity well forwarding by making relatively simple and local decisions using information that is already in possession of network switching elements 302 when the forwarding decision is made, thus avoiding various disadvantages and overhead associated with conventional forwarding protocols that involve packet discovery mechanisms to determine network pathways, as described previously.

The assignment of GW values for network switching elements 302 (and/or other nodes within rack domain 300) may be achieved automatically or semi-automatically, for example, by defining rules and/or conditions for assigning GW values by controller switching elements 304. In other embodiments, an administrative user of controller switching elements 304 may assign GW values to nodes directly, or may input the rules and/or conditions for assigning GW values. The assignment of GW values may be performed upon initialization of gravity well routing in rack domain 300 and may be repeated at desired intervals, irregularly, and/or in response to a stimulus, such as a command or another type of communication or a signal, etc.

In various embodiments, the GW values may be assigned based on various considerations and/or combinations of considerations. For example, GW values may be assigned according to security considerations for restricting access to packets (or certain packets) for at least some of the network switching elements 302. In some embodiments, GW values may be assigned according to throughput considerations for enabling a specified packet throughput rate during gravity well forwarding. In various embodiments, GW values may be assigned according to loading considerations for distributing packets according to a specified load distribution among network switching elements 302. In certain embodiments, GW values may be assigned according to redundancy considerations for enabling redundant forwarding paths among network switching elements 302. In given embodiments, GW values may be assigned according to a physical location of at least some of network switching elements 302. In particular embodiments, GW values may be assigned according to a physical proximity between at least some pairs of network switching elements 302. In this manner, gravity well routing, as described herein, may provide a simplified and low overhead protocol for achieving desired performance, redundancy, and/or security in a flexible manner in rack domain 300.

In addition to assigning GW values, controller switching elements 304 may store and/or maintain information in a LUT (such as LUT 214, see FIG. 2) associated with packets and/or packet flows. A packet flow may be a series of associated packets that are transmitted over a network. In particular embodiments, a packet flow may be used to transmit a data stream from a source to a destination, while the packets in this type of packet flow may share certain data within fields of the packets (e.g., source and destination identifiers). The LUT may be accessed by network switching elements 302 to identify a particular packet and/or packet flow. Accordingly, network switching elements 302 forwarding incoming packets may record information, such as results of forwarding decisions when using gravity well forwarding, for forwarding packets and/or packet flows.

Next, in operation of gravity well forwarding, an incoming packet may be received at a first network switching element 302 and may be forwarded to a second network switching element 302, as will now be described using an example with rack domain 300. The following example is intended to describe functionality of gravity well forwarding and may represent a simplified embodiment for descriptive purposes. It is noted that gravity well forwarding may be used with rack domains of various size and complexity, as well as in a hierarchical manner among rack domains. For example, gravity well forwarding may be used to first forward packets among different rack domains (not shown), and then used to forward packets within a given rack domain.

In the following example, it will be assumed that an incoming packet is received at network switching element 302-1 having a GW value of 2 and whose destination is network switching element 302-7 having a GW value of 33. The specific tuples that define the packet forwarding in this example may be registered (e.g., using a flow controller, a list, and/or a LUT, as described above) and may be accessible to network switching elements 302. The example of gravity well routing is described with respect to an incoming packet, but it will be understood that the methods described may be applicable to packet flows and/or other pluralities of packets. The incoming packet may first be received at network switching element 302-1 using a conventional protocol, such as IEEE 802.1Q, as an example. Network switching element 302-1, as part of the gravity well routing protocol, may determine that the incoming packet may be forwarded within rack domain 300 using gravity well forwarding. When network switching element 302-1 determines that the incoming packet may not be forwarded using gravity well forwarding, network switching element 302-1 may forward the incoming packet using conventional means. To implement gravity well forwarding, the following algorithm, represented using pseudo code, may be used by network switching elements 302.

---

Destination GW Value = D;
Current Node GW Value = GW;
Receive an incoming packet;
When D > GW, select an output port corresponding to a GW Value greater than W;
When D < GW, select an output port corresponding to a GW Value less than W;
When D = GW, terminate gravity well forwarding and determine an external destination for the incoming packet;
Record selection of the output port or external destination;
Output the incoming packet to the output port or external destination;

---

Gravity Well Forwarding Algorithm

One specific implementation of gravity well routing according to the example and the algorithm presented above will now be described with respect to rack domain 300. The incoming packet with D=33 may be received at network switching element 302-1 having GW=2. Since D>GW at network switching element 302-1, the output port corresponding to network switching element 302-2 having GW=3 is selected and the packet is output. At network switching element 302-2, D>GW, so the output port corresponding to network switching element 302-3 having GW=7 may be selected and the packet is output. At network switching element 302-3, D>GW, so the output port corresponding to network switching element 302-4 having GW=12 may be selected and the packet is output. At network switching element 302-4, D>GW, so the output port corresponding to network switching element 302-5 having GW=18 may be selected and the packet is output. At network switching element 302-5, D>GW, so the output port corresponding to network switching element 302-6 having GW=27 is selected and the packet is output. At network switching element 302-6, D>GW, so the output port corresponding to network switching element 302-7 having GW=33 is selected and the packet is output. At network switching element 302-7, D=GW, so gravity well forwarding may terminate and the packet may be forwarded to an external destination (not shown).

At each step in this example, network switching element 302 may further record the result of the decision made (also referred to as "leaving a bread crumb"), for example in LUT 214. When subsequent packets are received that correspond to the same origin and destination within rack domain 300, gravity well forwarding may be used in the same manner as described in the previous paragraph. In other embodiments, the bread crumb may be used to select a different pathway for the packet, for example, by selecting a different output port than was previously used. In this manner, packet load distribution across different ones of network switching elements 302 may be achieved. It will be understood that in different embodiments, network switching elements 302-8, 302-9, 302-10, and 302-11 may also be used. It is further noted that different algorithms may be used at different ones of network switching elements 302, for example according to security considerations, throughput considerations, loading considerations, redundancy considerations, physical location, and/or physical proximity, among other considerations, as described above.

Figure 4:
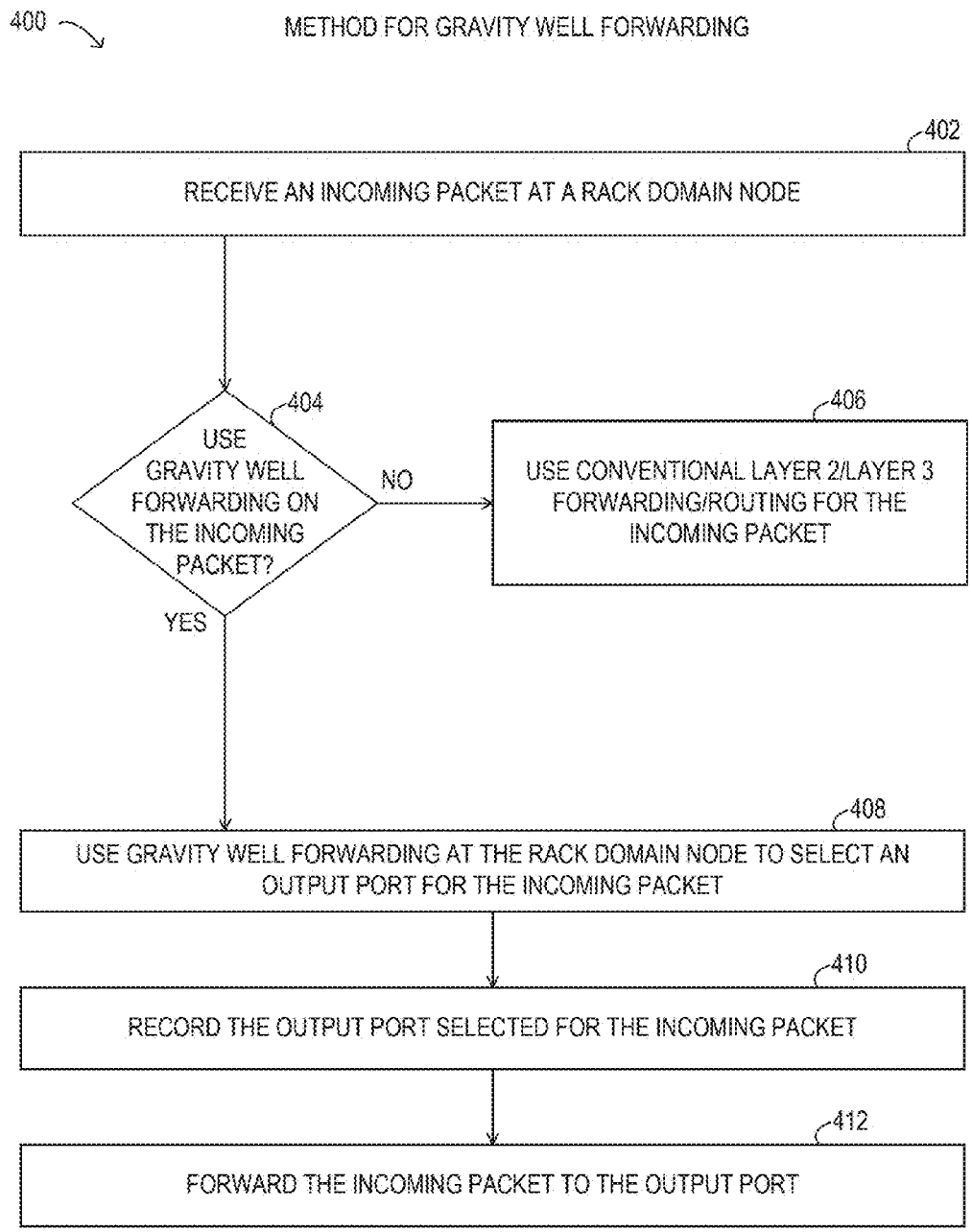
FIG. 4 is flowchart depicting selected elements of an embodiment of a method for gravity well forwarding.

Referring now to FIG. 4, a block diagram of selected elements of an embodiment of method 400 for gravity well forwarding is depicted in flowchart form. Method 400 may be performed using rack domain 200 and/or 300 (see FIGS. 2 and 3) for example, by network switching elements 202, 302. It is noted that certain operations described in method 400 may be optional or may be rearranged in different embodiments.

Method 400 may begin by receiving (operation 402) an incoming packet at a rack domain node. Then, a decision may be made whether to use gravity well forwarding (operation 404) on the incoming packet. The decision in operation 404 may be based on a destination gravity well value identified for the incoming packet. The decision in operation 404 may be based on information received from a controller node for gravity well routing (see controller switching elements 304 in FIG. 3). When the result of operation 404 is NO, conventional Layer 2/Layer 3 forwarding/routing may be used (operation 406) for the incoming packet. When the result of operation 404 is YES, gravity well forwarding may be used (operation 408) at the rack domain node to select an output port for the incoming packet. Operation 408 may include identifying a destination gravity well value for the incoming packet. Identifying the destination gravity well value for the incoming packet may include determining a destination identifier for the incoming packet and matching the destination identifier with a gravity well destination value. The destination identifier may be included in the incoming packet, for example, as a data field. In certain embodiments, operation 408 may implement at least portions of the gravity well forwarding algorithm described above. The output port selected for the incoming packet may be recorded (operation 410). The incoming packet may be forwarded (operation 412) to the output port. It is noted that forwarding of packets, as described herein, may include switching and/or routing of packets.

Methods and systems for improved pathway decision forwarding for rack domains include a gravity well forwarding protocol that enables local forwarding decisions at each network node involved with forwarding packets. The gravity well forwarding protocol may administer gravity well values for each of a plurality of rack domain nodes in a rack domain. The local forwarding decisions may involve selecting output ports corresponding to a higher/lower gravity well value at a network switching element, depending on a destination gravity well value associated with a network packet. Assignment of the gravity well values among the rack domain nodes may be used according to considerations, including security considerations, throughput considerations, loading considerations, redundancy considerations, physical location, and/or physical proximity, among other considerations, in the rack domain.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving an incoming packet at a first rack domain node having a first gravity well value, the first rack domain node included in a rack domain;
    determining whether to forward the incoming packet using gravity well forwarding, including determining whether a destination node for the incoming packet is included in the rack domain;
    when the destination node is included in the rack domain, forwarding the incoming packet using gravity well forwarding within the rack domain, further comprising:
        identifying a gravity well destination value associated with the destination node for the incoming packet;
        based on the gravity well destination value, selecting an output port of the rack domain, the output port corresponding to one of: a second rack domain node having a second gravity well value and a third rack domain node having a third gravity well value, wherein the second gravity well value is greater than the first gravity well value, and the first gravity well value is greater than the third gravity well value, wherein the second rack domain node and the third rack domain node are included in the rack domain; and
        forwarding the incoming packet to the output port; and
    when the destination node is not included in the rack domain, forwarding the incoming packet to the destination node without using gravity well forwarding,
    wherein respective gravity well values assigned to a plurality of rack domain nodes within the rack domain, including the first rack domain node, the second rack domain node, and the third rack domain node, are unique gravity well values that avoid looped forwarding paths within the rack domain when gravity well forwarding is used, and
    wherein selecting the output port further comprises:
        when the gravity well destination value is greater than the first gravity well value, selecting the output port corresponding to the second rack domain node; and
        when the gravity well destination value is less than the first gravity well value, selecting the output port corresponding to the third rack domain node.

2. The method of claim 1, wherein identifying the gravity well destination further comprises:
    determining a destination identifier for the destination node; and
    matching the destination identifier with the gravity well destination value.

3. The method of claim 2, wherein the destination identifier is included in the incoming packet.

4. The method of claim 1, wherein the gravity well values are assigned based on at least one of:
    security considerations for restricting access to incoming packets for at least some of the plurality of rack domain nodes;
    throughput considerations for enabling a specified packet throughput rate during gravity well forwarding;
    loading considerations for distributing packets according to a specified load distribution among the plurality of rack domain nodes;
    redundancy considerations for enabling redundant forwarding paths among the plurality of rack domain nodes;
    a physical location of at least some of the plurality of rack domain nodes; and
    a physical proximity between at least some pairs of the plurality of rack domain nodes.

5. An article of manufacture comprising a non-transitory computer-readable medium storing instructions, that, when executed by a processor, cause the processor to:
    receive an incoming packet at a first rack domain node having a first gravity well value, the first rack domain node included in a rack domain;
    determine whether to forward the incoming packet using gravity well forwarding, including determining whether a destination node for the incoming packet is included in the rack domain;
    when the destination node is included in the rack domain, forward the incoming packet using gravity well forwarding within the rack domain, further comprising instructions to:
        identify a gravity well destination value associated with the destination node for the incoming packet;
        based on the gravity well destination value, select an output port of the rack domain, the output port corresponding to one of: a second rack domain node having a second gravity well value and a third rack domain node having a third gravity well value, wherein the second gravity well value is greater than the first gravity well value, and the first gravity well value is greater than the third gravity well value, wherein the second rack domain node and the third rack domain node are included in the rack domain; and
        forward the incoming packet to the output port; and
    when the destination node is not included in the rack domain, forward the incoming packet to the destination node without using gravity well forwarding,
    wherein respective gravity well values assigned to a plurality of rack domain nodes within the rack domain, including the first rack domain node, the second rack domain node, and the third rack domain node, are unique gravity well values that avoid looped forwarding paths within the rack domain when gravity well forwarding is used, and
    wherein the instructions to select the output port further comprise instructions to:

when the gravity well destination value is greater than the first gravity well value, select the output port corresponding to the second rack domain node; and when the gravity well destination value is less than the first gravity well value, select the output port corresponding to the third rack domain node.

6. The article of manufacture of claim 5, wherein the instructions to identify the gravity well destination further comprise instructions to:

determine a destination identifier for the destination node; and match the destination identifier with the gravity well destination value.

7. The article of manufacture of claim 6, wherein the destination identifier is included in the incoming packet.

8. The article of manufacture of claim 5, wherein the first rack domain node includes at least one of: a network switch and a network router.

9. A network switching element comprising:

a processor having access to a memory; and a plurality of network ports, wherein the network switching element is a first rack domain node included in a rack domain having a first gravity well value, and wherein the memory stores instructions executable by the processor, that, when executed by the processor, cause the processor to:

receive an incoming packet at a first network port included in the plurality of network ports;

determine whether to forward the incoming packet using gravity well forwarding, including determining whether a destination node for the incoming packet is included in the rack domain; and when the destination node is included in the rack domain, forward the incoming packet using gravity well forwarding within the rack domain, further comprising instructions to:

identify a gravity well destination value associated with the destination node for the incoming packet;

based on the gravity well destination value, select an output port included in the plurality of network ports, the output port corresponding to one of: a second rack domain node having a second gravity well value and a third rack domain node having a third gravity well value, wherein the second gravity well value is greater than the first gravity well value, and the first gravity well value is greater than the third gravity well value, wherein the second rack domain node and the third rack domain node are included in the rack domain; and forward the incoming packet to the output port; and when the destination node is not included in the rack domain, forward the incoming packet to the destination node without using gravity well forwarding, wherein respective gravity well values assigned to a plurality of rack domain nodes within the rack domain, including the first rack domain node, the second rack domain node, and the third rack domain node, are unique gravity well values that avoid looped forwarding paths within the rack domain when gravity well forwarding is used, and wherein the instructions to select the output port further comprise instructions to:

when the gravity well destination value is greater than the first gravity well value, select the output port corresponding to the second rack domain node; and when the gravity well destination value is less than the first gravity well value, select the output port corresponding to the third rack domain node.

10. The network switching element of claim 9, wherein the instructions to identify the gravity well destination further comprise instructions to:

determine a destination identifier for the destination node; and match the destination identifier with the gravity well destination value.

11. The network switching element of claim 10, wherein the destination identifier is included in the incoming packet.

12. The network switching element of claim 9, wherein gravity well values are assigned based on at least one of:

security considerations for restricting access to incoming packets for at least some of the plurality of rack domain nodes;

throughput considerations for enabling a specified packet throughput rate during gravity well forwarding;

loading considerations for distributing packets according to a specified load distribution among the plurality of rack domain nodes;

redundancy considerations for enabling redundant forwarding paths among the plurality of rack domain nodes;

a physical location of at least some of the plurality of rack domain nodes; and a physical proximity between at least some pairs of the plurality of rack domain nodes.

\* \* \* \* \*